(12) United States Patent
Wagoner et al.

(10) Patent No.: US 6,335,998 B2
(45) Date of Patent: Jan. 1, 2002

(54) BLOCKLESS FIBER OPTIC ATTENUATORS AND ATTENUATION SYSTEMS EMPLOYING DISPERSION TAILORED POLYMERS

(75) Inventors: Gregory A. Wagoner, Watervliet, NY (US); Kevin J. McCallion, Boston, MA (US); Kwok Pong Chan, Troy; David G. Gascoyne, Schenectady, both of NY (US)

(73) Assignee: Molecular OptoElectronics Corporation, Watervliet, NY (US)

( * ) Notice: Subject to any disclaimer, the term of this patent is extended or adjusted under 35 U.S.C. 154(b) by 0 days.

(21) Appl. No.: 09/789,093

(22) Filed: Feb. 20, 2001

Related U.S. Application Data

(63) Continuation of application No. 09/139,787, filed on Aug. 25, 1998, now Pat. No. 6,205,280.

(51) Int. Cl.[7] ............................................... G02B 6/00
(52) U.S. Cl. ........................... 385/140; 385/12; 385/39; 385/40; 385/123
(58) Field of Search ................................ 385/12, 13, 15, 385/27, 30, 31, 32, 39, 40, 41, 123, 140

(56) References Cited

U.S. PATENT DOCUMENTS

| | | | |
|---|---|---|---|
| 4,060,308 A | 11/1977 | Barnoski et al. | 385/43 X |
| 4,343,532 A | 8/1982 | Palmer | 385/37 X |

(List continued on next page.)

FOREIGN PATENT DOCUMENTS

| | | | |
|---|---|---|---|
| DE | 4005557 A1 | 8/1991 | 385/3 X |
| DE | 4343943 A1 | 6/1995 | 385/15 X |
| EP | 0229456 A2 | 7/1987 | 385/42 X |
| EP | 0 488 266 A2 | 6/1992 | 359/341 X |
| GB | 2 184 859 A | 7/1987 | 385/140 X |
| GB | 2190211 A | 11/1987 | 385/140 X |
| JP | 60-203904 | 10/1985 | 385/11 X |
| JP | 06-114713 | 4/1994 | 385/123 X |
| WO | WO 89/01171 | 2/1989 | 385/11 X |
| WO | WO 95/05617 | 2/1995 | 385/122 X |

OTHER PUBLICATIONS

R.P. Pan et al., "Voltage–Controlled Optical Fiber Coupler Using a Layer of Low–Refractive Index Liquid Crystal with Positive Dielectric Anisotropy," *Jpn. J. Appl. Phys.* 34, Part 1, 6410–6415 (1995).

(List continued on next page.)

*Primary Examiner*—Brian Healy
(74) *Attorney, Agent, or Firm*—Kevin P. Radigan, Esq.; Heslin Rothenberg Farley & Mesiti P.C.

(57) ABSTRACT

Controllable fiber optic attenuators and attenuation systems are disclosed for controllably extracting optical energy from a fiber optic, and therefore attenuating the optical signal being transmitted through the fiber optic. In one aspect, material is removed from a portion of the fiber optic, thereby exposing a surface through which optical energy can be extracted. The portion of the fiber is suspended between two support points, and a controllable material is formed over the surface for controllably extracting optical energy according to a changeable stimulus applied thereto, which affects the refractive index thereof. In one embodiment, the changeable stimulus is temperature, and a controllable heating/cooling source can be provided in the attenuator for control of the attenuation. The limited amount of thermal contact between the suspended, side-polished portion of the fiber optic and the controllable material to surrounding structures offers a more predictable response, and improved response time. The controllable material, in one embodiment, may be a dispersion controlled (e.g., matched) polymer, offering uniform spectral characteristics of attenuation across a wavelength band of interest.

75 Claims, 7 Drawing Sheets

U.S. PATENT DOCUMENTS

| | | | |
|---|---|---|---|
| 4,387,954 A | 6/1983 | Beasley | 385/42 X |
| 4,469,544 A | 9/1984 | Goodman | 156/345 |
| 4,469,554 A | 9/1984 | Turner | 156/657 |
| 4,630,884 A | 12/1986 | Jubinski | 385/42 X |
| 4,630,890 A | 12/1986 | Ashkin et al. | 385/123 X |
| 4,704,151 A | 11/1987 | Keck | 65/4.1 |
| 4,712,866 A | 12/1987 | Dyott | 385/123 X |
| 4,753,497 A | 6/1988 | Fujii et al. | 385/42 X |
| 4,773,924 A | 9/1988 | Berkey | 65/3.11 |
| 4,778,237 A | 10/1988 | Sorin et al. | 385/42 X |
| 5,060,307 A | 10/1991 | El-Sherif | 359/173 |
| 5,078,465 A | 1/1992 | Dahlgren | 385/50 |
| 5,091,984 A | 2/1992 | Kobayashi et al. | 385/16 |
| 5,106,394 A | 4/1992 | Bramson | 51/309 |
| 5,108,200 A | 4/1992 | Nonaka et al. | 385/16 |
| 5,135,555 A | 8/1992 | Coyle, Jr. et al. | 65/12 |
| 5,136,818 A | 8/1992 | Bramson | 51/165.72 |
| 5,251,274 A * | 10/1993 | Carlstrom et al. | 385/13 |
| 5,265,178 A | 11/1993 | Braun et al. | 385/24 |
| 5,290,398 A | 3/1994 | Feldman et al. | 156/651 |
| 5,351,319 A | 9/1994 | Ginder et al. | 385/6 |
| 5,623,567 A | 4/1997 | Barberio et al. | 385/30 |
| 5,673,351 A * | 9/1997 | Clarke et al. | 385/100 |
| 5,781,675 A | 7/1998 | Tseng et al. | 385/30 |
| 5,853,969 A | 12/1998 | Harada et al. | 430/510 |
| 5,966,493 A * | 10/1999 | Wagoner et al. | 385/140 |
| 6,151,438 A * | 11/2000 | Espindola et al. | 385/140 |
| 6,191,224 B1 * | 2/2001 | Chan et al. | 525/195 |
| 6,205,280 B1 * | 3/2001 | Wagoner et al. | 385/140 |
| 6,208,798 B1 * | 3/2001 | Morozov et al. | 385/140 |
| 6,275,320 B1 * | 8/2001 | Dhuler et al. | 385/140 X |

OTHER PUBLICATIONS

M. J. F. Digonnet et al., "Measurement of the Core Proximity in Polished Fiber Substrates and Couplers," *Optics Letters* 10, 463–465 (1985).

O. G. Leminger & R. Zengerle, "Determination of Single–Mode Fiber Coupler Design Parameters from Loss Measurements," *IEEE Journal of Lightwave Technology* LT–3, 864–867 (1985).

M.H. Cordaro et al., "Precision Fabrication of D–Shaped Single–Mode Optical Fibers by In Situ Monitoring," *IEEE Journal of Lightwave Technology* 12, 1524–1531 (1994).

J. Gowar, *Optical Communication Systems*, ch. 3, 58–77 (2d Ed. 1993).

U.T. Mueller–Westerhoff et al., "The Synthesis of Dithiolene Dyes with Strong Near–IR Absorption", *Tetrahedron* 47, 909–932 (1991).

Bergh, R. A. et al., "Single–Mode Fibre Optic Directional Coupler," *Electron. Lett.*16(7), pp. 260–261 (Mar. 1980).

Birks, Timothy A. and Li, Youwei W., "The Shape of Fiber Tapers," *IEEE J. Lightwave Techn.* 10 (4), pp. 432–438 (Apr. 1992).

Brophy, Timothy J. et al., "Formation and Measurement of Tapers in Optical Fibers," *Rev. Sci. Instrum.* 64 (9) pp. 2650–2654 (Sep. 1993).

Carrara, S. L. A. et al., "Elasto–Optic Alignment of Birefringent Axes in Polarization–Holding Optical Fiber," *Opt. Lett.* 11 (7), pp. 470–472 (Jul. 1986).

Diez Aj et al., "Cynlindrical Metal–Coated Optical Fibre Devices for Filters and Sensors," *Electron. Lett.* 32 (15), pp. 1390–1392 (Jul. 1996).

Hussey, C.D. and Minelly, J.D., "Optical Fibre Polishing with a Motor–Driven Polishing Wheel," *Electron. Lett.* 24, pp. 805–807 (Jun. 1988).

Kenny, R.P. et al., "Control of Optical Fibre Taper Shape," *Electron. Lett.* 27 (18), pp. 1654–1656 (Aug. 1991).

Love, J.D. et al., "Quantifying Loss Minimisation in Single–Mode Fibre Tapers," *Electron. Lett.* 22 (17) pp. 912–914 (Aug. 1986).

McCallion, Kevin J. and Shimazu, Michael, "Side–Polished Fiber Provides Functionality and Transparency," *Optoelectronics World*, S19, S20, S22 and S24 (Sep. 1998).

Morozov Val et al., "Fused Fiber Optic Variable Attenuator," *OFC 2000, 25th Annual Optical Fiber Commincations Conference*, pp. 22–24 (Mar. 10, 2000).

Parriaux, O. et al., "Distributed Coupling on Polished Single–Mode Optical Fibers," *Appl. Opt.* 20, pp. 2420–2423 (Jul. 1981).

Todd, David A. et al., "Polarization–splitting Polished Fiber Optic Couplers," *Optical Engineering* 32 (9), pp. 2077–2082 (Sep. 1993).

* cited by examiner

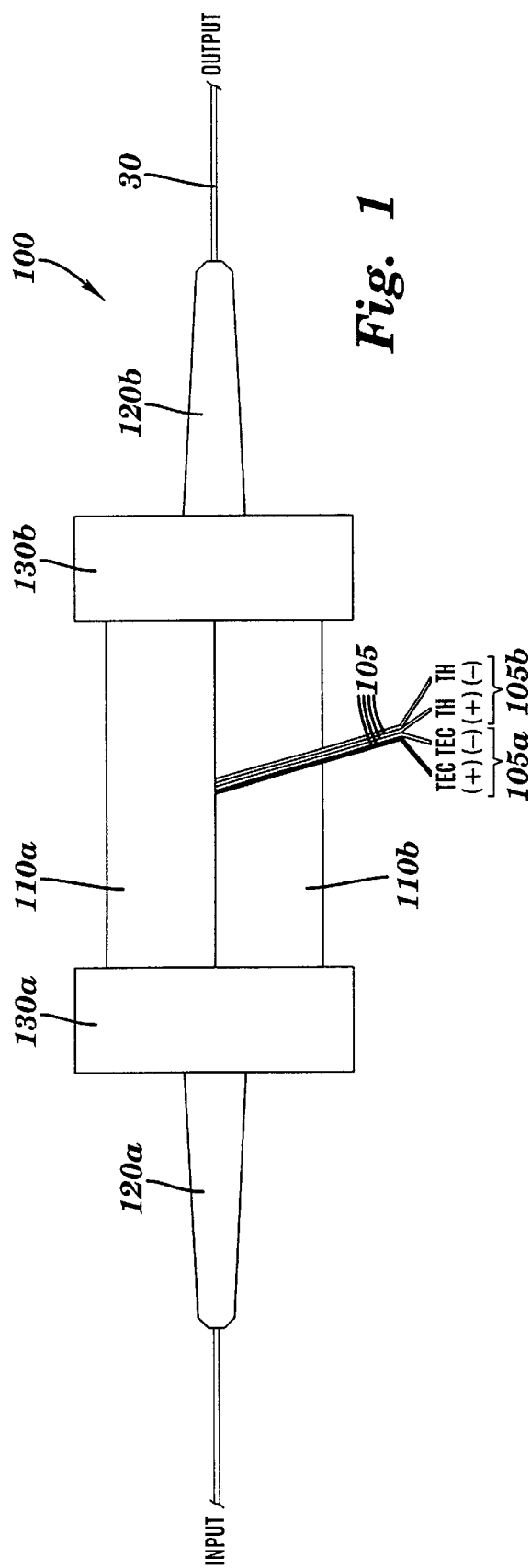
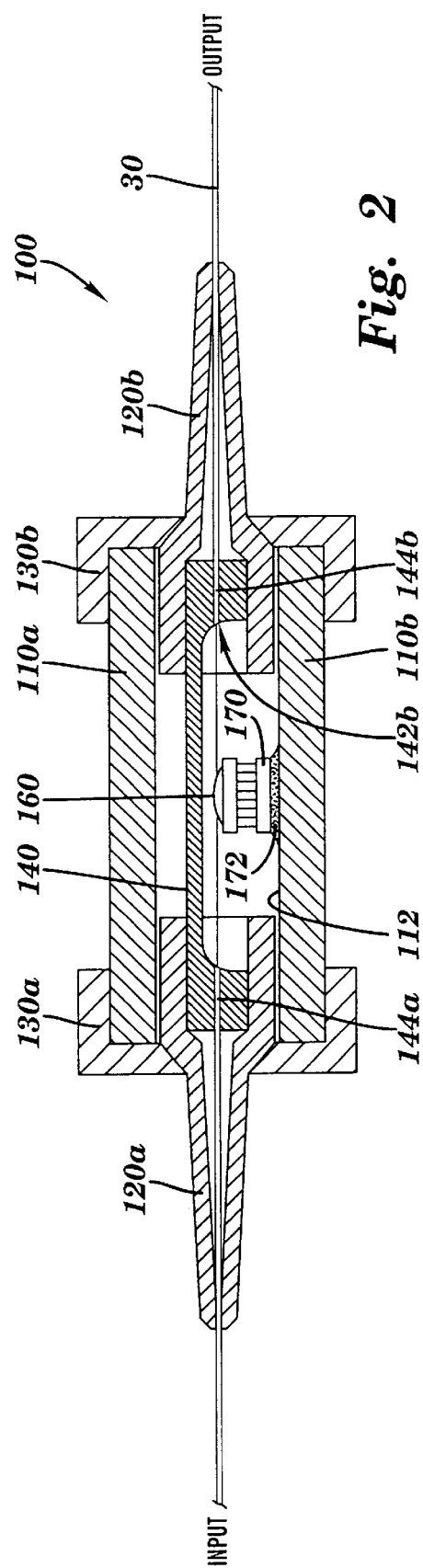
Fig. 1
Fig. 2

BLOCKLESS FIBER OPTIC ATTENUATORS AND ATTENUATION SYSTEMS EMPLOYING DISPERSION TAILORED POLYMERS

CROSS-REFERENCE TO RELATED APPLICATIONS

This Application is a continuation of U.S. application Ser. No. 09/139,787, filed Aug. 25, 1998, entitled "BLOCKLESS FIBER OPTIC ATTENUATORS AND ATTENUATION SYSTEMS EMPLOYING DISPERSION TAILERED POLYMERS," now U.S. Pat. No. 6,205,280 and also is related to U.S. patent application Ser. No. 09/026,755, filed Feb. 20, 1998, and entitled "FIBER OPTIC ATTENUATORS AND ATTENUATION SYSTEMS;" now U.S. Pat. No. 5,966,493 and U.S. patent application Ser. No. 09/139,457, filed Aug. 25, 1998, and entitled "DISPERSION CONTROLLED POLYMERS FOR BROADBAND FIBER OPTIC DEVICES"; now U.S. Pat. No. 6,191,224 and U.S. patent application Ser. No. 09/139,832 filed concurrently herewith, and entitled "BLOCKLESS TECHNIQUES FOR SIMULTANEOUS POLISHING OF MULTIPLE FIBER OPTICS."

Each of these Applications is hereby incorporated by reference herein in its entirety.

TECHNICAL FIELD

The present invention relates to controllable attenuators and attenuation systems for attenuating optical energy transmitted through a fiber optic.

BACKGROUND OF THE INVENTION

There are requirements in fiber optic systems for precise control of optical signal levels entering various system components. This is particularly true for systems at test and characterization stages of deployment. A controllable optical attenuator can be used, for example, to characterize and optimize the optoelectronic response of high-speed photoreceivers, wherein the detection responsivity is dependent on the average optical power incident on the photodiode.

The majority of controllable fiber optic attenuators currently commercially available rely on thin-film absorption filters, which require breaking the fiber and placing the filters in-line. Controllable attenuation is then achieved by mechanical means such as rotating or sliding the filter to change the optical path length within the absorptive material. This adversely impacts the response speed of the device, the overall mechanical stability, zero attenuation insertion loss and optical back reflection. In general, broken fiber designs suffer numerous disadvantages such as high insertion loss, significant back reflection, and large size. These factors can be minimized, although such corrective measures typically result in added cost and/or size.

Additional issues have impeded the development of thermo-optic variable attenuators, including: (i) the thermal mass of surrounding materials and/or structures which significantly degrades device response time; and (ii) spectrally non-uniform attenuation, resulting from a dispersion mismatch between the optical mode index of the underlying transmission media and a controllable overlay material.

Improved controllable fiber optic attenuators and attenuation systems are therefore required which keep the optical fiber core intact, which achieve controllable attenuation via control of radiative loss from the fiber, and which offer improved response time and spectral uniformity over the wavelength bands of interest.

SUMMARY OF THE INVENTION

The shortcomings of the prior approaches are overcome, and additional advantages are provided, by the present invention, which in one aspect relates to an attenuator for attenuating optical energy transmitted through a portion of a fiber optic. The portion of the fiber optic has an exposed surface through which at least some of the optical energy can be controllably extracted. This portion of the fiber optic is suspended within a support structure, and a controllable material is formed over the exposed surface of the fiber optic for controllably extracting the optical energy. The controllable material controllably extracts the energy according to a changeable stimulus, e.g., temperature. The portion of the fiber optic and the controllable material are both positioned to be substantially thermally insulated from any surrounding structures.

The attenuator may also include a controllable heating/cooling source in operative contact with the controllable material to change the temperature thereof, and therefore the attenuating effects thereof. A substantially cylindrical housing may be provided, which includes the support structure, and encloses the portion of the fiber optic, the controllable material and the controllable heating/cooling source. A sensor may also be provided for sensing the temperature of the controllable material, and control leads for both the controllable heating/cooling source and the temperature sensor are provided.

By suspending the fiber optic, and substantially thermally insulating the fiber optic and the controllable material from any surrounding support structures, device size is reduced, and thermo-optic response time is improved.

To improve spectral uniformity of the response of the attenuator across a given wavelength band (e.g., 1520 nm to 1580 nm), the controllable material may have its optical dispersion properties controlled (e.g., matched) in accordance with those of the fiber in this band. Preferably, the controllable material has its optical dispersion properties substantially matched to those of the fiber in the band of interest. The control of the dispersion properties is effected using, for example, polymers with added dyes, discussed in detail in the co-filed Application entitled "DISPERSION CONTROLLED POLYMERS FOR BROADBAND FIBER OPTIC DEVICES."

The present invention, in another aspect, relates to methods for attenuating optical energy in a fiber optic using the attenuator discussed above, as well as methods for forming the attenuator discussed above.

The "blockless," dispersion controlled attenuator of the present invention provides a high performance design with wide flexibility. The simplicity of the design permits low-cost, high-volume manufacturing without sacrificing optical performance.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

FIG. 1 is a front elevational view of a controllable fiber optic attenuator in accordance with the present invention;

FIG. 2 is a central, cross-sectional view of the attenuator of FIG. 1;

FIG. 5 is a system within which the attenuator of FIGS. 1–3 can be employed;

DETAILED DESCRIPTION OF THE PREFERRED EMBODIMENT(S)

Figure 3:
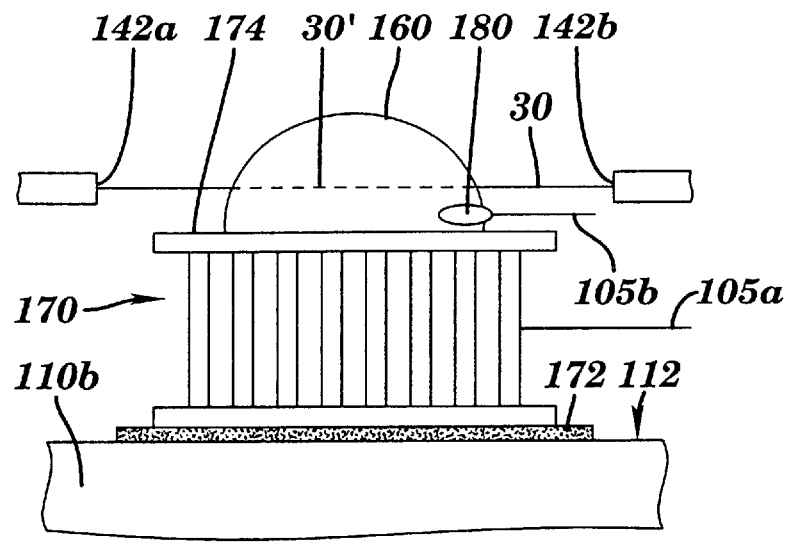
FIG. 3 is an enlarged view of certain features of the attenuator of FIGS. 1 and 2.

In accordance with the elevational view of FIG. 1, an attenuator 100 is provided in accordance with the present invention for attenuating optical energy transmitted in fiber optic 30. Attenuator 100 includes a housing comprising, for example, strain reliefs 120a and 120b, shell pieces 110a and 110b, and end caps 130a and 130b. Control leads 105a and 105b may also be provided for attenuator control.

As discussed further below, the attenuator is formed with respect to a portion of the fiber optic having material removed therefrom, thereby exposing a surface thereof, through which optical energy can be controllably extracted. By maintaining the integrity of the fiber optic within this attenuator, unnecessary losses due to interruption of the fiber can be controlled. In one exemplary embodiment, the entire housing, including the strain reliefs, is 2.375 inches in length, and about 0.5 inches in diameter. Therefore, the attenuator of the present invention can be implemented in a relatively small package suitable for many types of system and/or field uses.

Internal details of attenuator 100 are shown in the central cross-sectional view thereof of FIG. 2. As discussed above, a housing comprising, in one example, strain reliefs 120a and 120b, end caps 130a and 130b, and shell pieces 110a and 110b is provided to accommodate the input and output sections of the fiber, as well as additional, internal components. Another exemplary portion of the housing, i.e., fiber support structure 140, is also shown in FIG. 2 having two support points 142a and 142b between which the fiber is suspended. These support points are at the ends of longitudinal notches 144a and 144b formed in structure 140 to accommodate the input and output portions of the fiber.

In accordance with the previously filed U.S. application Ser. No. 09/026,755 entitled "FIBER OPTIC ATTENUATORS AND ATTENUATION SYSTEMS," a bulk material, here designated 160, can be formed over a side-polished surface of the fiber to controllably remove optical energy therefrom. Either electro-optic or thermo-optic materials are appropriate for this purpose, whose refractive indices, and therefore their attenuation effects, vary with applied electrical or thermal stimuli, respectively. Shown in FIG. 2 is an exemplary thermo-optic material 160 in contact with the suspended, side-polished portion of fiber optic 30, and with an underlying controllable heating/cooling (heating and/or cooling) source 170 which is mounted, via a thermally conductive epoxy 172, to an inside wall 112 of shell piece 110b.

The suspension of the portion of the fiber 30 and material 160, without any other significant thermal contacts, results in an efficient, thermally insulated attenuation device such that any changes in temperature induced by the controllable heating/cooling source 170 are transferred solely, and quickly, to the thermo-optic material 160, but to no other surrounding structures. This "blockless" technique stands in contrast to the prior technique described in the above-mentioned, previously filed U.S. Application, wherein the fiber is mounted in a block, and any thermal changes in the material are also affected by the heat sink characteristics of the block within which the side-polished fiber is mounted, and on which the material is formed. In the approach disclosed herein, since the fiber is suspended in a thermally insulative environment (e.g., air or any other effective thermal insulator), and is in thermal contact with only material 160 (also thermally insulated except for its contact with source 170), the heat sink effect of surrounding structures is minimized, and faster and more predictable control of the temperature, and therefore the optical attenuating effects, are provided.

Figure 4:
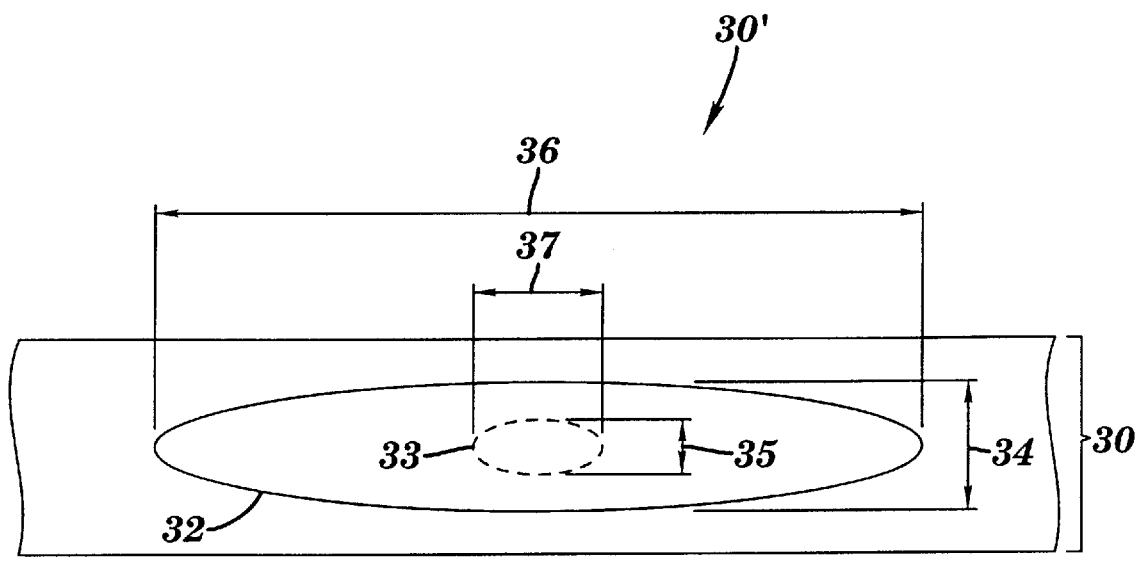
FIG. 4 is a top plan view of a side-polished fiber optic showing the exposed surface and an exemplary optical interaction area.

With reference to the enlarged view of FIG. 3, as discussed above, controllable heating/cooling source 170 is mounted to an inside housing wall 112, using epoxy 172, and projects toward fiber optic 30. Source 170 supports a controllable material 160 on its active control surface 174. As discussed herein, a portion 30' of fiber optic 30 has material removed therefrom thereby exposing the evanescent field of the optical energy transmitted therein such that at least some of the optical energy can be controllably extracted therefrom, using controllable material 160. With reference to FIG. 4, this portion 30' of fiber optic 30 is shown in greater detail. Fiber optic 30, for example, is polished into its cladding, approaching the core, thereby exposing a surface 32 having, in one example, a width 34 dimension of 100 μm, and a length 36 dimension of 7–10 mm. This substantially flat surface may be formed by polishing the cladding of the fiber optic in accordance with the techniques disclosed in the above-incorporated, concurrently filed, U.S. Patent Application entitled "BLOCKLESS TECHNIQUES FOR SIMULTANEOUS POLISHING OF MULTIPLE FIBER OPTICS." Though the cladding is polished to this surface 32, the actual evanescent optical interaction area 33 is much smaller, i.e., having a width 35 of 10 μm and a length 37 of 2 mm. In general, this optical interaction area 33 must be substantially covered by the controllable material 160, but the material can actually extend beyond this optical interaction area 33 to encompass the entire polished surface 32.

Referring to FIGS. 1–4, one exemplary fabrication technique for the attenuator includes:

a) polishing a portion 30' of the fiber (FIGS. 3 and 4);
b) suspending the polished portion of the fiber between two support points 142a and 142b of a fiber support structure (e.g., 140, FIG. 2) and gluing the adjacent input and output portions of the fiber in respective, preformed, longitudinal notches running outward toward the distal ends of the support structure;
c) affixing the controllable heating/cooling source 170 to an inner wall 112 of an outer shell piece 110b of a housing using a thermally conductive epoxy 172;

d) forming the controllable material 160 on a control surface 172 of the controllable heating/cooling source 170 such that it retains some softness (at least temporarily); and e) bringing the fiber support structure 140 and the shell piece 110b into their assembled relationship wherein the suspended fiber portion 30' is immersed in the softened controllable material 160 such that at least the interaction area 33 thereof is covered by a portion of material 160.

As discussed above with reference to FIGS. 1–3, material 160 may be controlled using a controllable heating/cooling source 170. Further, a sensor 180 can be placed (FIG. 3) in material 160, to measure the resultant temperature thereof. The signal representing the temperature can be carried from the attenuator using sense leads 105b, and the controllable heating/cooling source can be operated using control leads 105a.

Figure 5A:
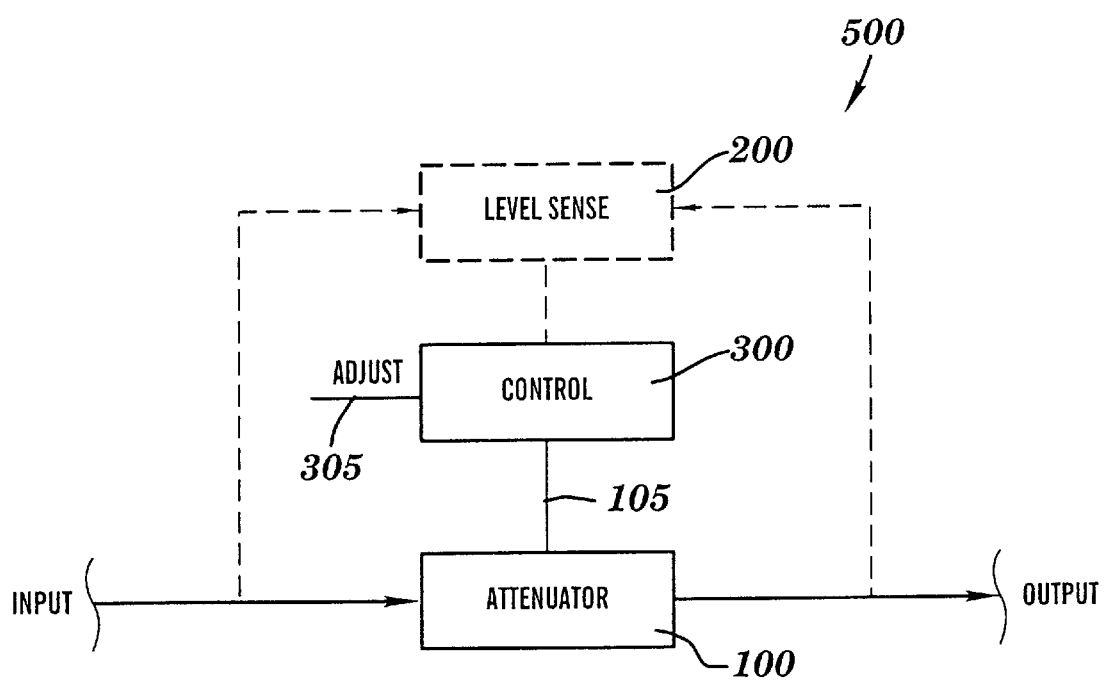
FIG. 5A is a block diagram of an exemplary attenuation system in accordance with the present invention.
Figure 5B:
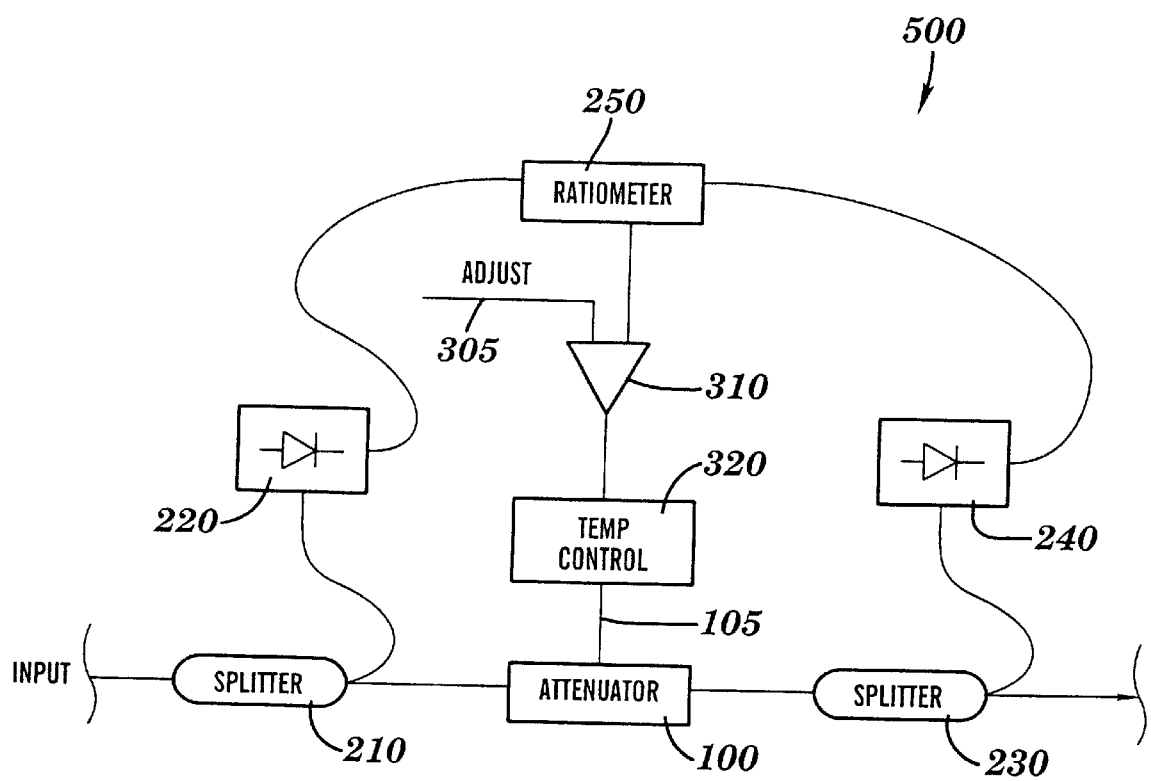
FIG. 5B is an exemplary schematic of the attenuation system FIG. 5A.
Figure 5C:
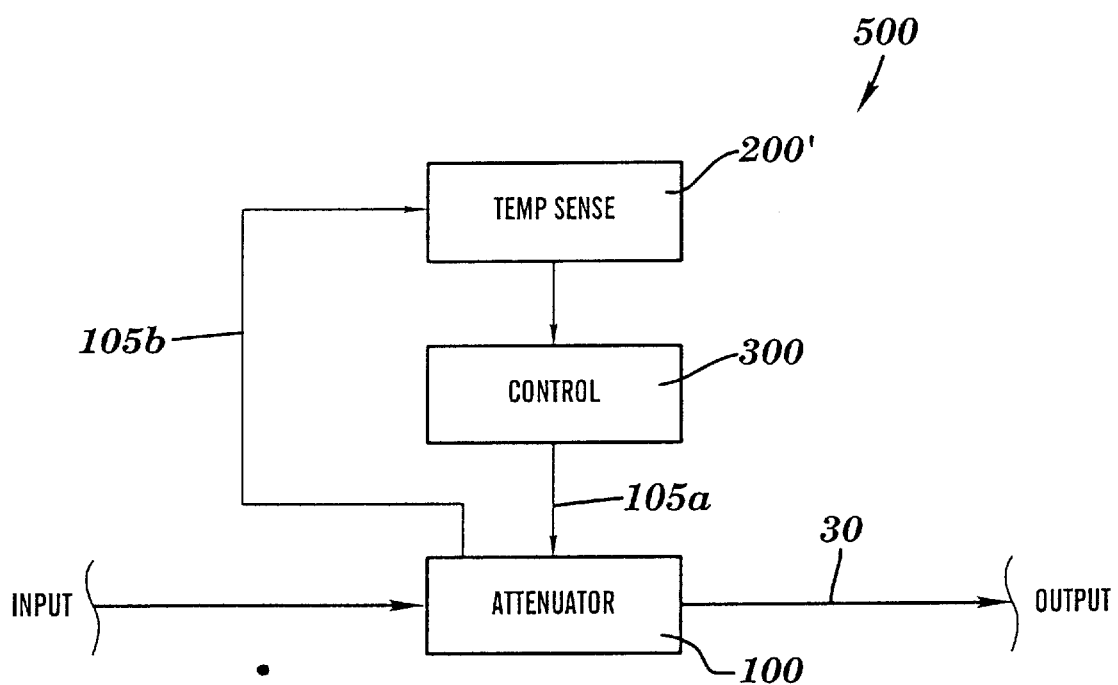
FIG. 5C is a further example of a system within which the attenuator of FIGS. 1–3 can be employed.

FIG. 5 depicts an exemplary system 500 employing attenuator 100, and its electrical control leads 105a and sense leads 105b. Sense leads 105b can be operated by a temperature sensing unit 200, which provides a result thereof to control circuit 300. (It should be noted that attenuator 100 normally requires calibration subsequent to its fabrication so that its optical response to changes in the temperature of the controllable material can be accurately predicted, and therefore used for accurate control, in an operational system, such as system 500.)

In one exemplary embodiment, the controllable heating/cooling source is a thermo-electric cooler (Melcor part number FC0.45-4-05); the thermal sensor is a thermistor (Fenwell Electronics part number 112-503JAJ-B01), and the fiber is a single mode fiber, (Corning part number SMF-28).

Attenuation System(s) Employing Controllable Attenuators

Another exemplary attenuation system 500 employing controllable attenuator 100 is shown in FIG. 5A. The attenuation system 500 includes a controllable attenuator 100, a control circuit 300, and an optional level-sense circuit 200'. Control circuit 300 supplies control stimulus 105 to the controllable attenuator 100 to change the changeable stimulus (temperature or voltage) and therefore the refractive index of the controllable material thereof. Control circuit 300 receives as an optional input a desired level stimulus 305 from, for example, a user, and adjusts the control stimulus 105 as a function thereof. Control circuit 300 may also receive an optional sensed level stimulus from level sense circuit 200. This sensed level stimulus can be, for example, a ratio of measured levels of optical energy both prior to and following the attenuation thereof by the attenuator 100. By comparing this sensed level stimulus to the desired level stimulus, control circuit 300 can vary the value of control stimulus 105 until the input desired level stimulus and sensed level stimulus are matched.

Exemplary attenuation system 500 is depicted in an exemplary schematic form in FIG. 5B. The controllable attenuator 100 is preceded and followed by 1% fiber couplers (splitters 210, 230) which tap a small fraction of the optical power propagating in the fiber. The decoupled light is carried to characterized photodetectors (220, 240) and the generated photocurrents are analyzed by a ratiometer 250. Comparator circuit 310 receives the sensed level stimulus output of the ratiometer and/or a desired level stimulus 305 (from a user) and transmits a signal to the temperature controller 320. The temperature controller provides the control stimulus 105 to controllable attenuator 100 to change the changeable stimulus (temperature or voltage) and therefore the refractive index of the controllable material thereof.

In this way, the optical attenuation level (photocurrent ratio) is directly compared to a calibrated attenuation adjustment signal 305 (user or system input) until they are matched. This feedback loop controls the attenuation effected by the controllable attenuator and therefore ensures accurate performance.

Improvement in the spectral uniformity of the device can be obtained through proper choice of the controllable material 160. More particularly, dispersion controlled polymers such as any of those disclosed in the above-incorporated, concurrently filed U.S. Patent Application entitled "DISPERSION CONTROLLED POLYMERS FOR BROADBAND FIBER OPTIC DEVICES," can be used as the controllable material 160 to improve spectral uniformity.

A mis-match between the dispersion characteristics of the material and the dispersion characteristics of the fiber may result in spectrally non-uniform attenuation across a band of interest (e.g., 1520–1580 nm). By controlling the dispersion of material 160, spectral uniformity can be improved. Preferably, the dispersion of material 160 should be controlled to be matched to that of the mode index of the fiber, thereby providing optimum spectral uniformity.

As explained in detail in the co-filed Application, polymers with added dyes provide the required dispersion control, and are also thermo-optically active. One preferred material comprises about 0.82% by weight bis[1,2-[4-ethyl heptyl amino)phenyl]-1,2-ethylenedithiolate]nickel and about 99.18% weight of a polymer formed from about 60% by weight pentafluorophenyl acrylate and about 40% by weight tetrafluoropropyl methacrylate; another comprises about 1.9% by weight bis[1,2-[4-(ethyl heptyl amino) phenyl]-1,2-ethylenedithiolate]platinum and about 98.1% by weight polar olefin polymer comprising monomeric units derived from about 80% by weight pentafluorophenyl acrylate and about 20% by weight tetrafluoropropyl methacrylate.

In particular, the dispersion-controlled polymer composition comprises a polymer and a dye. The polymer is typically a polar olefin polymer, which may, for example, comprise monomeric units derived from an acrylate or from two or more polar olefins.

A suitable dye is, for example, (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate, or a metal complex dye having the general formula bis[1,2-[(4-alkyl$^1$ alkyl$^2$ amino)phenyl]-1,2-ethylenedithiolate]Met represented by structure (I)

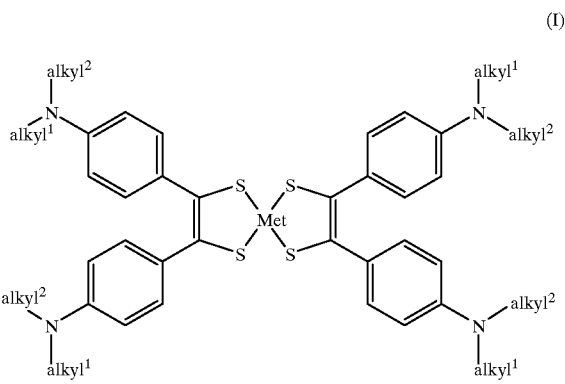

(I)

Alkyl$^1$ and alkyl$^2$ are each independently lower alkyls containing 2 to 8 carbon atoms. In addition, alkyl$^1$ may differ from or may be the same as alkyl$^2$. Met is a Group IIIB metal, such as nickel, palladium or platinum. Exemplary metal complex dyes include bis[1,2-(4-dibutylaminophenyl)-1,2-ethylenedithiolate]nickel; bis[1,2-[4-(ethyl heptyl amino)phenyl]-1,2-ethylenedithiolate]nickel; bis[1,2-(4-dibutylaminophenyl)-1,2-ethylenedithiolate]platinum; or bis[1,2-[4-(ethyl heptyl amino)phenyl]-1,2-ethylenedithiolate]platinum.

The polar olefins, from which the monomeric units of the polymer are derived, are typically acrylates or may be selected from, but not limited to: tetrafluoropropyl acrylate, tetrafluoropropylmethacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride. As commonly used in the chemical art, the term "polar" refers to, e.g., the property in which the positive and negative electrical charges of the olefin monomers are permanently separated, and the term "olefin" refers to, e.g., the class of unsaturated aliphatic hydrocarbons having one or more double bonds. Polar olefin polymers, also referred to in the art as "polyolefins", are easily synthesized from a variety of commercially available polar olefin monomers using conventional polymerization reactions.

Figure 6:
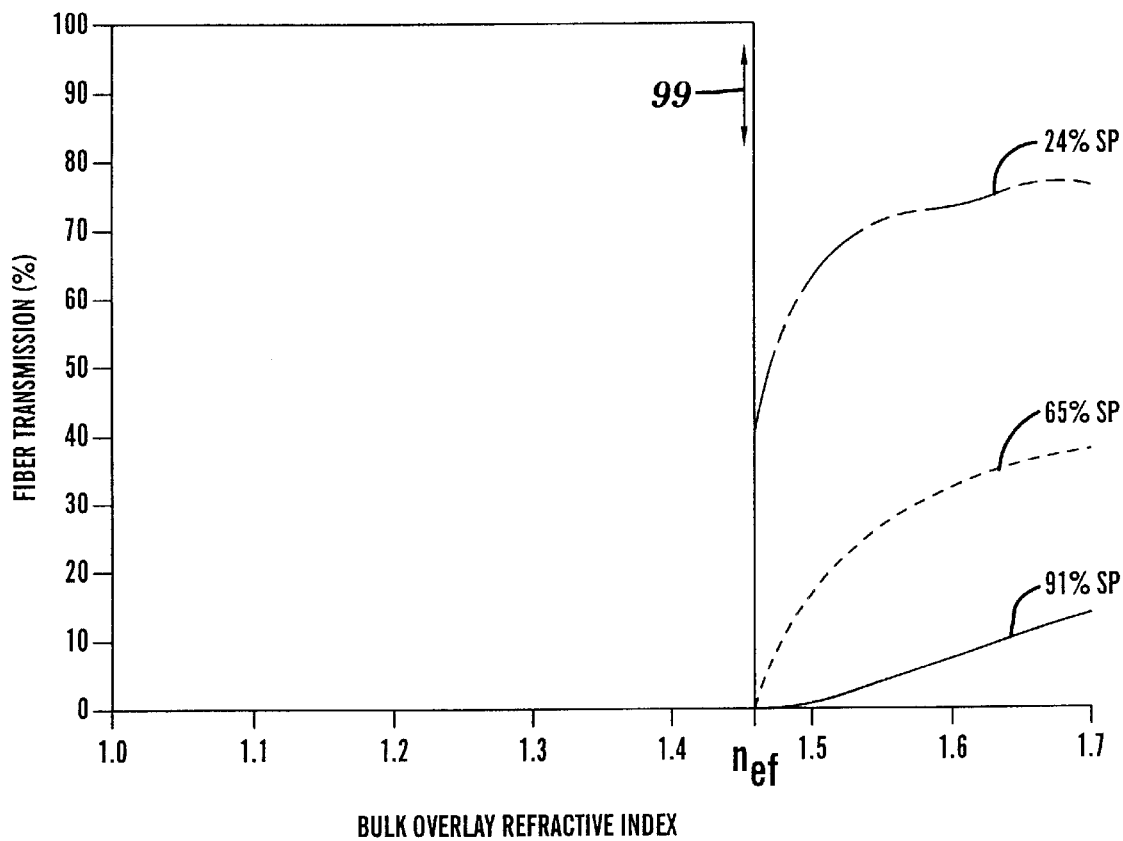
FIG. 6 is a graph depicting, in percentage, the loss characterization versus the refractive index of an overlay material for three exemplary levels of fiber side-polishing.

In the previously filed U.S. Application, a cladding-driven approach was disclosed in which a thin, controllable cladding layer is placed between a high index bulk overlay and the surface of the fiber. The high index bulk material has an index significantly greater than the effective mode index of the fiber ($n_{ef}$). By using a higher overlay index, the spectrally non-uniform characteristics of the device were avoided, such as those along curve 99 depicted in FIG. 6 (reproduced from FIG. 2a of the previously filed Application, and explained in greater detail therein). However, by using materials having their dispersion controlled relative to the dispersion of the fiber mode index, operation along curve 99, with the refractive index of the overlay approximating that of the fiber, is possible with spectral uniformity.

Figure 7A:
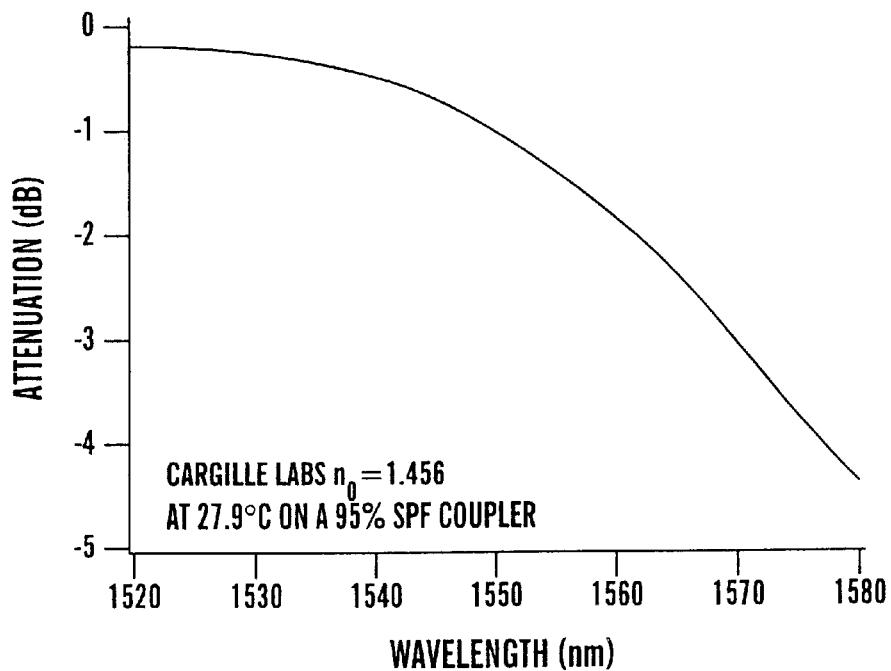
FIGS. 7a–b are spectral plots of the attenuation obtained using a standard overlay material, and a dispersion-matched overlay material, respectively.
Figure 7B:
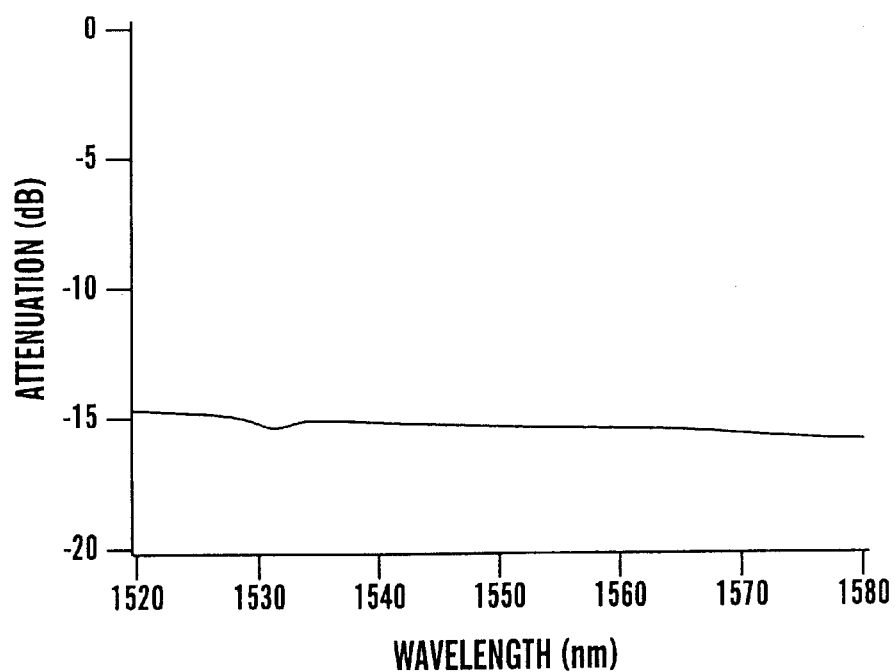

The spectral attenuation characteristics of a non-dispersion controlled material (Cargille oil, $n_D$=1.456 at 27° C. on a 95% polished fiber) are shown in FIG. 7a in the range of 1520–1580 nm. The spectral attenuation characteristics of the same device using an approximately dispersion matched polymer (40% DMMA, 60% TFPMA and 0.9 mole % Ni (ethyl, heptyl) dye at 19° C.) are shown in FIG. 7b. As is evident from a comparison of the spectra of 7a and 7b, using dispersion matched polymers greatly increases the spectral uniformity in a given wavelength band of interest. In this example, the attenuation level remains constant to within about 0.5 dB over this spectral range.

The disclosed "blockless" side-polished fiber approach, and the dispersion-matched thermo-optic materials, have permitted the development of the disclosed high performance, low cost broad-band compact variable attenuator. The blockless approach allows fiber components to be produced with minimal size, weight and thermal mass. This dramatically reduces device size and thermo-optic response time (to possibly about one second). Further, the incorporation of dispersion matched materials yields devices which have a spectrally uniform response, which is especially desirable for broadband applications.

In addition to these benefits, the blockless approach also retains the intrinsic performance characteristics of continuous fiber devices: low insertion loss, low back reflection (return loss), and low polarization-dependent loss ("PDL"). Exemplary performance levels of the disclosed attenuator are shown below in Table 1.

TABLE 1

| QUANTITY | VALUE | UNIT |
|---|---|---|
| Dynamic Range | 50 | dB |
| Spectral Variance (1500–1600 nm) | 0.5 | dB |
| Excess Loss | 0.05 | dB |
| PDL | 0.5 | dB |
| Return Loss | −55 | dB |
| Optical Power Handling | 20 | dBm |
| DC Power Consumption | <200 | mW |

In accordance with the present invention, it is also possible to develop more sophisticated designs such as ovenized and/or multiple thermo-electric cooling devices to improve device stability. Further, because of the design flexibility afforded by the dispersion-matched polymers (i.e., control of the refractive index), it is possible to design custom applications which exhibit minimal power consumption and varying operating temperatures.

In summary, the blockless, dispersion matched fiber optic attenuator of the present invention is a high performance design with wide flexibility. The simplicity of the design permits low-cost, high-volume manufacturing without sacrificing performance.

While the invention has been particularly shown and described with reference to preferred embodiment(s) thereof, it will be understood by those skilled in the art that various changes in form and details may be made therein without departing from the spirit and scope of the invention.

What is claimed is:

1. An attenuator for attenuating optical energy, comprising:
a portion of a fiber optic through which the optical energy is transmitted, having a side surface through which at least some of said optical energy can be controllably extracted; and
a controllable material formed over the surface of the fiber optic for controllably extracting said optical energy;
wherein the controllable material controllably extracts the optical energy according to a changeable stimulus applied thereto;
wherein the changeable stimulus comprises temperature, and wherein the attenuator further comprises:
a controllable heating/cooling source, wherein the controllable heating/cooling source comprises a controllable heating and cooling source in operative contact with the controllable material to raise and lower the temperature thereof.

2. The attenuator of claim 1, further comprising:
a housing enclosing the portion of the fiber optic, the controllable material and the controllable heating/cooling source.

3. The attenuator of claim 2, wherein the controllable heating/cooling source is mounted in the housing such that a control surface of the controllable heating/cooling source is in operative contact with the controllable material.

4. An attenuator for attenuating optical energy, comprising:
a portion of a fiber optic through which the optical energy is transmitted, having a side surface through which at least some of said optical energy can be controllably extracted; and
a controllable material formed over the surface of the fiber optic for controllably extracting said optical energy;
wherein the controllable material controllably extracts the optical energy according to a changeable stimulus applied thereto;

wherein the changeable stimulus comprises temperature, and wherein the attenuator further comprises:
a controllable heating/cooling source in operative contact with the controllable material to change the temperature thereof; and
a thermal sensor for sensing the temperature of the controllable material.

5. The attenuator of claim 4, further comprising:
at least one control lead emanating from the controllable heating/cooling source for control thereof; and
at least one sense lead emanating from the thermal sensor for transmitting a signal representative of the temperature of the controllable material as sensed by the sensor.

6. The attenuator of claim 4, wherein the controllable material has its optical dispersion properties tailored in accordance with those of the fiber across a given wavelength band, and comprises a polymer and a dye.

7. The attenuator of claim 6, wherein the controllable material has its optical dispersion properties substantially matched to those of the fiber in the given wavelength band of interest.

8. The attenuator of claim 7, wherein the controllable material comprises about 0.82% by weight bis[1,2-[4-ethyl heptyl amino)phenyl]-1,2-ethylenedithiolate]nickel and about 99.18% weight of a polymer formed from about 60% by weight pentafluorophenyl acrylate and about 40% by weight tetrafluoropropyl methacrylate; or about 1.9% by weight bis[1,2-[4-(ethyl heptyl amino)phenyl]-1,2-ethylenedithiolate]platinum and about 98.1% by weight polar olefin polymer comprising monomeric units derived from about 80% by weight pentafluorophenyl acrylate and about 20% by weight tetrafluoropropyl methacrylate.

9. An attenuator for attenuating optical energy transmitted through a fiber optic, comprising:
a housing enclosing a portion of the fiber optic, the portion of the fiber optic having an exposed surface through which at least some of the optical energy can be controllably extracted;
the portion of the fiber optic being suspended within the housing;
a controllable material formed over the exposed surface of the fiber optic for controllably extracting optical energy in accordance with a changeable stimulus applied thereto; and
a stimulus source mounted in the housing, projecting towards the suspended portion of the fiber optic, and in operative contact with the controllable material to apply the changeable stimulus thereto.

10. The attenuator of claim 9, wherein the changeable stimulus comprises temperature, the portion of the fiber optic and the controllable material are both positioned within the housing to be substantially thermally insulated from any surrounding structures, and the stimulus source comprises a controllable heating/cooling source.

11. An attenuator for attenuating optical energy transmitted through a fiber optic, comprising:
a housing enclosing a portion of the fiber optic, the portion of the fiber optic having a side surface through which at least some of the optical energy can be controllably extracted;
a controllable material formed over the surface of the fiber optic for controllably extracting optical energy in accordance with a changeable stimulus applied thereto; and
a stimulus source mounted in the housing and in operative contact with the controllable material to apply the changeable stimulus thereto;
wherein the changeable stimulus comprises temperature, and the stimulus source comprises a controllable heating/cooling source, the attenuator further comprising:
a thermal sensor for sensing the temperature of the controllable material.

12. The attenuator of claim 11, further comprising:
at least one control lead emanating from the controllable heating/cooling source for control thereof; and
at least one sense lead emanating from the thermal sensor for transmitting a signal representative of the temperature of the controllable material as sensed by the sensor.

13. The attenuator of claim 11, wherein the controllable material has its optical dispersion properties tailored in accordance with those of the fiber across a given wavelength band, and comprises a polymer and a dye.

14. The attenuator of claim 13, wherein the controllable material has its optical dispersion properties substantially matched to those of the fiber in the given wavelength band of interest.

15. The attenuator of claim 14, wherein the controllable material comprises about 0.82% by weight bis[1,2-[4-ethyl heptyl amino)phenyl]-1,2-ethylenedithiolate]nickel and about 99.18% weight of a polymer formed from about 60% by weight pentafluorophenyl acrylate and about 40% by weight tetrafluoropropyl methacrylate; or about 1.9% by weight bis[1,2-[4-(ethyl heptyl amino)phenyl]-1,2-ethylenedithiolate]platinum and about 98.1% by weight polar olefin polymer comprising monomeric units derived from about 80% by weight pentafluorophenyl acrylate and about 20% by weight tetrafluoropropyl methacrylate.

16. A method for attenuating optical energy transmitted in a fiber optic, comprising:
providing, in an attenuator, a portion of the fiber optic through which the optical energy is transmitted, having a side surface through which at least some of said optical energy can be controllably extracted;
forming a controllable material over said surface of the fiber optic for controllably extracting said optical energy; and
attenuating the optical energy by applying a changeable stimulus to the controllable material thereby controllably extracting said optical energy;
wherein the changeable stimulus is temperature; the method further comprising:
raising and lowering the temperature of the controllable material using a controllable heating and cooling source.

17. The method of claim 16, wherein the changeable stimulus is temperature, the portion of the fiber optic is substantially thermally insulated from any surrounding structures, and said forming includes positioning the controllable material to be substantially thermally insulated from any surrounding structures.

18. A method for attenuating optical energy transmitted in a fiber optic, comprising:
providing, in an attenuator, a portion of the fiber optic through which the optical energy is transmitted, having a side surface through which at least some of said optical energy can be controllably extracted;
forming a controllable material over said surface of the fiber optic for controllably extracting said optical energy; and
attenuating the optical energy by applying a changeable stimulus to the controllable material thereby controllably extracting said optical energy;

wherein the changeable stimulus is temperature; the method further comprising:
sensing the temperature of the controllable material with a thermal sensor provided in the attenuator.

19. The method of claim 18, wherein the controllable material has its optical dispersion properties tailored in accordance with those of the fiber across a given wavelength band, and comprises a polymer and a dye.

20. The method of claim 19, wherein the controllable material has its optical dispersion properties substantially matched to those of the fiber in the given wavelength band of interest.

21. The method of claim 20, wherein the controllable material comprises about 0.82% by weight bis[1,2-[4-ethyl heptyl amino)phenyl]-1,2-ethylenedithiolate]nickel and about 99.18% weight of a polymer formed from about 60% by weight pentafluorophenyl acrylate and about 40% by weight tetrafluoropropyl methacrylate; or about 1.9% by weight bis[1,2-[4-(ethyl heptyl amino)phenyl]-1,2-ethylenedithiolate]platinum and about 98.1% by weight polar olefin polymer comprising monomeric units derived from about 80% by weight pentafluorophenyl acrylate and about 20% by weight tetrafluoropropyl methacrylate.

22. A method for forming an attenuator in relation to a portion of a fiber optic through which optical energy is to be transmitted, comprising:
providing a side surface of a portion of the fiber optic through which at least some of the optical energy can be controllably extracted;
suspending the portion of the fiber optic in a housing;
mounting a stimulus source in the housing to project toward the suspended portion of the fiber optic;
forming a controllable material on a control surface of the stimulus source, the controllable material for controllably extracting the optical energy according to a stimulus from the stimulus source; and
bringing the portion of the fiber optic into contact with the controllable material such that the side surface of the portion of the fiber optic is substantially covered by the controllable material.

23. The method of claim 22, wherein the stimulus comprises temperature, the portion of the fiber optic and the controllable material are positioned to be substantially thermally insulated.

24. The method of claim 22, wherein the controllable material has its optical dispersion properties tailored in accordance with those of the fiber across a given wavelength band, and comprises a polymer and a dye.

25. The method of claim 24, wherein the controllable material has its optical dispersion properties substantially matched to those of the fiber in the given wavelength band of interest.

26. The method of claim 25, wherein the controllable material comprises about 0.82% by weight bis[1,2-[4-ethyl heptyl amino)phenyl]-1,2-ethylenedithiolate]nickel and about 99.18% weight of a polymer formed from about 60% by weight pentafluorophenyl acrylate and about 40% by weight tetrafluoropropyl methacrylate; or about 1.9% by weight bis[1,2-[4-(ethyl heptyl amino)phenyl]-1,2-ethylenedithiolate]platinum and about 98.1% by weight polar olefin polymer comprising monomeric units derived from about 80% by weight pentafluorophenyl acrylate and about 20% by weight tetrafluoropropyl methacrylate.

27. A method for forming an attenuator in relation to a portion of a fiber optic through which optical energy is to be transmitted, comprising:
providing a side surface of a portion of the fiber optic through which at least some of the optical energy can be controllably extracted;
disposing the portion of the fiber optic in a housing;
mounting a stimulus source in the housing;
forming a controllable material on a control surface of the stimulus source, the controllable material for controllably extracting the optical energy according to a stimulus from the stimulus source;
bringing the portion of the fiber optic into contact with the controllable material such that the surface of the portion of the fiber optic is substantially covered by the controllable material; and
providing a thermal sensor in the attenuator for sensing the temperature of the controllable material.

28. A method for forming an attenuator in relation to a portion of a fiber optic through which optical energy is to be transmitted, comprising:
providing a side surface of a portion of the fiber optic through which at least some of the optical energy can be controllably extracted;
mounting a stimulus source in a housing;
forming a controllable material on a control surface of the stimulus source, the controllable material for controllably extracting the optical energy according to a stimulus from the stimulus source; and
bringing the portion of the fiber optic into contact with the controllable material such that the side surface of the portion of the fiber optic is substantially covered by the controllable material;
wherein the changeable stimulus comprises temperature, and the stimulus source comprises a controllable heating/cooling source, wherein the controllable heating/cooling source comprises a controllable heating and cooling source in operative contact with the controllable material to raise and lower the temperature thereof.

29. The attenuator of claim 1, 4, 9 or 11 in combination with an attenuation system, comprising a circuit for providing a feedback signal having a value related to the optical energy transmitted in the fiber optic, wherein the controllable material controllably extracts the optical energy in accordance with said feedback signal.

30. The combination of claim 29, wherein said circuit comprises a level circuit, coupled for ascertaining a level of at least a portion of the optical energy transmitted in the fiber optic and providing a level stimulus, said level stimulus comprising said feedback signal.

31. The combination of claim 30, further comprising at least one sensor for determining said level of at least a portion of the optical energy transmitted in the fiber optic.

32. The combination of claim 31, wherein said at least one sensor comprises at least one optical sensor coupled to said fiber optic for sensing said level of at least a portion of the optical energy transmitted therein.

33. The combination of claim 31, wherein said at least one sensor comprises a thermal sensor for sensing the temperature of the controllable material.

34. The attenuator of claim 1, wherein the controllable material has its optical dispersion properties tailored in accordance with those of the fiber across a given wavelength band, and comprises a polymer and a dye.

35. The attenuator of claim 9, wherein the controllable material has its optical dispersion properties tailored in accordance with those of the fiber across a given wavelength band, and comprises a polymer and a dye.

36. The attenuator of claim 6, 13, 34 or 35, wherein the controllable material comprises a polar olefin polymer and a metal complex dye of nickel or platinum.

37. The attenuator of claim 36, wherein the polymer comprises monomeric units derived from an acrylate.

38. The attenuator of claim 6, 13 or 34 or 35, wherein the controllable material comprises a polar olefin polymer and a metal complex dye of nickel, palladium, or platinum, or comprises a polar olefin polymer and (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

39. The attenuator of claim 38, wherein the metal complex dye has the formula bis[1,2-[(4-alkyl$^1$ alkyl$^2$ amino)phenyl]-1,2-ethylenedithiolate]Met having structure (I)

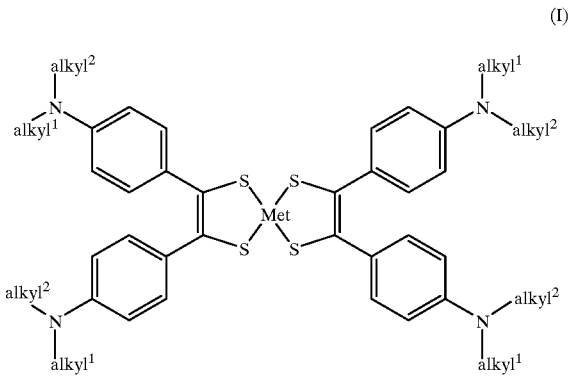

(I)

wherein alkyl$^1$ and alkyl$^2$ are each independently selected from the group consisting of lower alkyls containing 2 to 8 carbon atoms, wherein alkyl$^1$ may differ from or may be the same as alkyl$^2$, and wherein Met is selected from the group consisting of nickel, palladium and platinum.

40. The attenuator of claim 38, wherein said polar olefin polymer comprises monomeric units derived from an acrylate.

41. The attenuator of claim 38, wherein said polar olefin polymer comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

42. The attenuator of claim 1, 4, 9 or 11, wherein said optical energy is radiated from said fiber optic into said controllable material.

43. The attenuator of claim 1 or 9, further comprising:
a thermal sensor for sensing the temperature of the controllable material.

44. The attenuator of claim 4, 9 or 11, wherein the controllable heating/cooling source comprises a controllable heating and cooling source in operative contact with the controllable material to raise and lower the temperature thereof.

45. The method of claim 16 or 18, in combination with a method for operating an attenuation system, the system comprising a circuit for providing a feedback signal having a value related to the optical energy transmitted in the fiber optic, wherein the controllable material controllably extracts the optical energy in accordance with said feedback signal.

46. The combination of claim 45, wherein said circuit comprises a level circuit, coupled for ascertaining a level of at least a portion of the optical energy transmitted in the fiber optic and providing a level stimulus, said level stimulus comprising said feedback signal.

47. The combination of claim 46, further comprising providing at least one sensor for determining said level of at least a portion of the optical energy transmitted in the fiber optic.

48. The combination of claim 47, wherein said at least one sensor comprises at least one optical sensor coupled to said fiber optic for sensing said level of at least a portion of the optical energy transmitted therein.

49. The combination of claim 47, wherein said at least one sensor comprises a thermal sensor for sensing the temperature of the controllable material.

50. The method of claim 16, wherein the controllable material has its optical dispersion properties tailored in accordance with those of the fiber across a given wavelength band, and comprises a polymer and a dye.

51. The method of claim 19 or 50, wherein the controllable material comprises a polar olefin polymer and a metal complex dye of nickel or platinum.

52. The method of claim 51, wherein the polymer comprises monomeric units derived from an acrylate.

53. The method of claim 19 or 50, wherein the controllable material comprises a polar olefin polymer and a metal complex dye of nickel, palladium, or platinum, or comprises a polar olefin polymer and (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

54. The method of claim 53, wherein the metal complex dye has the formula bis[1,2-[(4-alkyl$^1$ alkyl$^2$ amino)phenyl]-1,2-ethylenedithiolate]Met having structure (I)

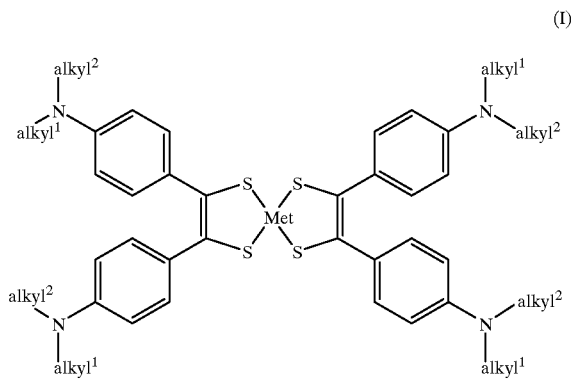

(I)

wherein alkyl$^1$ and alkyl$^2$ are each independently selected from the group consisting of lower alkyls containing 2 to 8 carbon atoms, wherein alkyl$^1$ may differ from or may be the same as alkyl$^2$, and wherein Met is selected from the group consisting of nickel, palladium and platinum.

55. The method of claim 53, wherein said polar olefin polymer comprises monomeric units derived from an acrylate.

56. The method of claim 53, wherein said polar olefin polymer comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

57. The method of claim 16 or 18, wherein said optical energy is radiated from said fiber optic into said controllable material.

58. The method of claim 16, further comprising:
sensing the temperature of the controllable material with a thermal sensor provided in the attenuator.

59. The method of claim 18, further comprising:
raising and lowering the temperature of the controllable material using a controllable heating and cooling source.

60. The method of claim 22, 27 or 28, in combination with a method for forming an attenuation system, the system comprising a circuit for providing a feedback signal having a value related to the optical energy transmitted in the fiber optic, wherein the controllable material controllably extracts the optical energy in accordance with said feedback signal.

61. The combination of claim 60, wherein said circuit comprises a level circuit, coupled for ascertaining a level of at least a portion of the optical energy transmitted in the fiber optic and providing a level stimulus, said level stimulus comprising said feedback signal.

62. The combination of claim 61, further comprising at least one sensor for determining said level of at least a portion of the optical energy transmitted in the fiber optic.

63. The combination of claim 62, wherein said at least one sensor comprises at least one optical sensor coupled to said fiber optic for sensing said level of at least a portion of the optical energy transmitted therein.

64. The method of claim 62, wherein said at least one sensor comprises a thermal sensor for sensing the temperature of the controllable material.

65. The method of claim 27, wherein the controllable material has its optical dispersion properties tailored in accordance with those of the fiber across a given wavelength band, and comprises a polymer and a dye.

66. The method of claim 28, wherein the controllable material has its optical dispersion properties tailored in accordance with those of the fiber across a given wavelength band, and comprises a polymer and a dye.

67. The method of claim 24, 65 or 66, wherein the controllable material comprises a polar olefin polymer and a metal complex dye of nickel or platinum.

68. The method of claim 67, wherein the polymer comprises monomeric units derived from an acrylate.

69. The method of claim 24, 65 or 66, wherein the controllable material comprises a polar olefin polymer and a metal complex dye of nickel, palladium, or platinum, or comprises a polar olefin polymer and (8-((3-(6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

70. The method of claim 69, wherein the metal complex dye has the formula bis[1,2-[(4-alkyl$^1$ alkyl$^2$ amino)phenyl]-1,2-ethylenedithiolate]Met having structure (I)

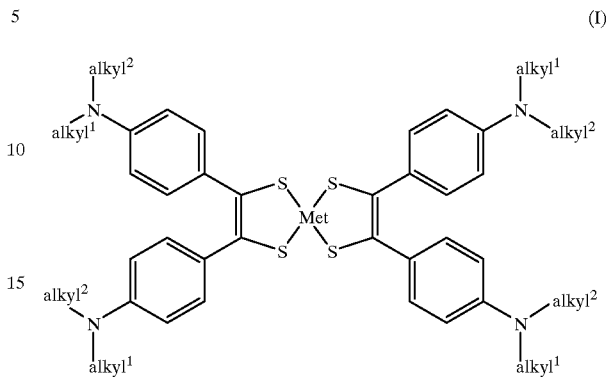

wherein alkyl$^1$ and alkyl$^2$ are each independently selected from the group consisting of lower alkyls containing 2 to 8 carbon atoms, wherein alkyl$^1$ may differ from or may be the same as alkyl$^2$, and wherein Met is selected from the group consisting of nickel, palladium and platinum.

71. The method of claim 69, wherein said polar olefin polymer comprises monomeric units derived from an acrylate.

72. The method of claim 69, wherein said polar olefin polymer comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

73. The method of claim 22, 27 or 28, wherein said optical energy is radiated from said fiber optic into said controllable material.

74. The method of claim 22 or 28, further comprising:
providing a thermal sensor for sensing the temperature of the controllable material.

75. The method of claim 22 or 27, wherein the controllable heating/cooling source comprises a controllable heating and cooling source in operative contact with the controllable material to raise and lower the temperature thereof.

* * * * *